United States Patent Office 2,854,412
Patented Sept. 30, 1958

2,854,412

METHOD OF MAKING A PERMANENT MAGNET

Frank G. Brockman, Dobbs Ferry, and Walter G. Steneck, Jr., Ossining, N. Y., assignors to North American Philips Co., Inc., New York, N. Y., a corporation of Delaware No Drawing. Application December 23, 1954
Serial No. 477,433

4 Claims. (Cl. 252—62.5)

Our invention relates to a method of making a permanent magnet.

More particularly, our invention relates to the manufacture of non-metallic type permanent magnets described in detail in copending application Ser. No. 239,264, filed July 30th, 1951, now Patent No. 2,762,777, by J. J. Went et al. As disclosed in that application, those magnets are constituted by highly-compacted dense sintered bodies built up principally of hexagonal crystals of $MFe_{12}O_{19}$ or $MFe_{18}O_{27}$ having dimensions less than about $10\mu$, M being at least one of the metals barium, strontium, and/or lead. If desired, up to 0.4 as an atom fraction of one of said metals may be replaced by calcium.

Those magnets are characterized by an intrinsic coercive force $_IH_c$ of at least 700 oersted, a remanence $(B_r)$ of at least 1200 gauss, and a maximum energy product up to $1.1 \times 10^{+6}$ gauss-oersted.

It is a principal object of our invention to provide an improved magnet of the aforesaid type.

It is another object of our invention to improve the manufacture of such a magnet by insuring greater reproducibility of results.

Another object of our invention is to increase the remanence and maximum energy product of such magnets.

These and further objects of our invention will appear as the specification progresses.

In preparing magnets of the type disclosed in the said copending application, one or more of the oxides, BaO, SrO, and PbO, or compounds which upon heating decompose to the oxides, are mixed with $Fe_2O_3$ in a wide range of proportions. The mixture is suitably compacted and then sintered at about 900 to 1450° C. until a relatively dense body built up principally of crystals whose maximum dimensions do not exceed $10\mu$ is obtained.

We have found quite unexpectedly that the rate at which the highly compacted oxide mixture is brought up to the firing temperature has a profound effect on the properties of the resulting magnet. Moreover, we have also found that by controlling the firing temperature within a narrow range and keeping the compacted mixture at that firing temperature for a very short period of time, a substantial improvement in the properties of the magnet is obtained.

Finally, we have also found that best and most readily reproducible results are obtained if the oxides are mixed with $Fe_2O_3$ in the mole proportions 1.0 to 1.2:6.0.

Thus, we have found that if the pressed mass of oxides is raised to a firing temperature of about 1200° C.–1275° C. at a rate of about 8° C. to 72° C./min., and the mixture sintered at the firing temperature for less than five (5) minutes, substantial increases in the values of remanence and maximum energy product are obtained over similar products prepared in a conventional manner.

While we prefer to compact the oxide mixture under shaping pressures of about 6,000–17,000 lbs./in.$^2$, the bodies may be extruded using a volatilizable binder such as a gum binder made by dissolving 2 gms. of gum acacia and gum tragacanth in 130 cc. of distilled water.

For reasons which we are unaware of, the methods according to our invention result in permanent magnets having the same high intrinsic coercive force as disclosed in said copending application with unexpectedly high values of remanence and maximum energy product.

The following example is illustrative of the invention as it may be carried out with specific materials in specific proportions and employing specific techniques. It is not, however, to be construed as limiting the invention as disclosed therein, the invention being defined in the claims appended thereto.

EXAMPLE

*Preliminary processing*

6 moles of $Fe_2O_3$ and 1.1 moles of the equivalent of BaO in the form of $BaCO_3$ were weighed out and ball milled together in a steel mill using steel balls, in the presence of ethyl alcohol (133 cc. to 100 gms. of solid) for 5 hours. After milling the slurry was filtered, dried and prefired after crushing all lumps, at 1000° C. for 4 hours. This prefired product was then ball milled under the same conditions for 6¾ hours and pressed into rods under a pressure of 16,300 lbs. sq. in.

*Final firing procedure*

A tube furnace, fitted with a mechanical drive, was heated and allowed to come to equilibrium at 1261° C. The prefired rod was placed on a carriage connected to the mechanical drive and driven into the furnace at a rate such that the temperature rise of the rod was 72° C./min. as measured by a platinum and platinum-rhodium thermocouple until the rod reached a temperature of 1261° C. After remaining in the central heat portion of the furnace for less than one minute, the rod was withdrawn from the furnace and allowed to cool. The rod of this example showed an intrinsic coercive force $(_IH_c)$ of 1875 oersteds, a maximum energy product $(BH)_{max}$ of 1.13 gauss-oersteds and a remanence $(B_r)$ of 2370 gauss.

Additional samples were made in which the mole ratios of the oxides were varied. These examples showed an improvement in the maximum energy product $(BH)_{max}$ when the mole ratios of the $Fe_2O_3$ to the other oxides were kept within the range 6:1.0 to 1.2 as indicated by the following table:

TABLE I

| Mole Ratio BaO:Fe$_2$O$_3$ | $(BH)_{max}$ ($\times 10^{-6}$ gauss-oersteds) |
|---|---|
| 0.95:6.0 | 0.62 |
| 1.00:6.0 | 0.78 |
| 1.05:6.0 | 1.0 |
| 1.10:6.0 | 1.0 |
| 1.2:6.0 | 0.88 |

However, when the rate at which the samples are heated to the firing temperature, the firing temperature itself, the length of time for which the samples are held at the firing temperature itself, and the mole ratio of oxides are held within the ranges claimed a much greater improvement in the $(BH)_{max}$ is achieved along with significant improvements in the remanence $(B_r)$ and the coercive force $(H_c)$. The results obtained when all these variables are controlled is shown by the following table.

TABLE II

| Sample No.[1] | Rate of Heating, °C/Min. | Time on Firing Temp. | $B_r$ Gauss | $H_c$ Oersted | $(BH)_{max} \times 10^{-6}$ Gauss-Oersted | Firing Temp., °C. |
|---|---|---|---|---|---|---|
| 20-27 | 72 | <1 Min | 2,370 | 1,875 | 1.13 | 1,261 |
| 20-25 | 50 | <1 Min | 2,325 | 1,825 | 1.07 | 1,266 |
| 20-31 | 50 | 1 Hr | 1,150 | 350 | 1.12 | 1,260 |
| 20-30 | 50 | 2 Hr | 950 | 200 | 1.08 | 1,268 |
| 20-21 | 15 | <1 Min | 2,300 | 1,800 | 1.04 | 1,256 |
| 20-10 | 15 | 1 Hr | 2,150 | 1,550 | 0.81 | 1,255 |
| 20-18 | 15 | 2 Hr | 1,400 | 650 | 0.23 | 1,255 |
| 20-32 | 8 | <1 Min | 2,300 | 1,795 | 1.05 | 1,238 |
| 20-33 | 8 | 1 Hr | 2,200 | 1,625 | 0.92 | 1,263 |
| 20-34 | 8 | 2 Hr | 1,490 | 690 | 0.25 | 1,263 |

[1] Note each sample used had a mole ratio of 1.1 moles of the BaO to 6 moles of the $Fe_2O_3$.

Table II clearly illustrates the remarkable improvement in the remanence ($B_r$) and the coercive force ($H_c$) along with the maintenance of a high maximum energy product $(BH)_{max}$ when the firing temperature used falls within the range 1250° C.–1270° C., the rate of heating of the samples ranges from 8° C./min.–72° C./min. and the length of time for which the samples are exposed to the firing temperature is less than 1 minute. As the table shows optimum results for all properties are obtained when the samples are heated to the firing temperature at the rate of 72° C./min.

Although optimum results are obtained when the samples are exposed to the firing temperature for less than 1 minute an unexpected improvement in our samples is also achieved when the samples are exposed to the firing temperature for a period of time less than 5 minutes as shown by the following table.

TABLE III

| Sample No.[1,2] | $B_r$ Gauss | $H_c$ Oersted | $(BH)_{max} \times 10^{-6}$ Gauss-Oersted | Firing Temp., °C. | Time exposed to firing Temp., minutes |
|---|---|---|---|---|---|
| BaFe 20-24 | 2,300 | 1,775 | 1.05 | 1,268 | <5 |
| BaFe 20-23 | 2,290 | 1,775 | 1.05 | 1,266 | <5 |
| BaFe 20-22 | 2,275 | 1,775 | 1.05 | 1,258 | <5 |
| BaFe 20-21 | 2,265 | 1,775 | 1.04 | 1,256 | <5 |
| BaFe 20-20 | 2,280 | 1,763 | 1.03 | 1,256 | <5 |
| BaFe 20-19 | 2,270 | 1,775 | 1.02 | 1,257 | <5 |
| BaFe 20-11 | 2,250 | 1,785 | 1.04 | 1,256 | <5 |

[1] The mole ratio used in these samples was 1.1 moles of BaO to 6 moles of $Fe_2O_3$.
[2] The heating rate for these samples was approximately 15° C. per minute.

It should be understood that any equivalent heating means such as, for example, a batch type oven with automatic temperature control or an equivalent temperature control means may be substituted for the heating means and temperature control means of the above example.

While we have thus described our invention with reference to the above samples and tables, further modifications within the scope of our invention will be apparent to those skilled in the art, without departing from the spirit and scope of the invention as defined in the appended claims.

What we claim is:

1. The method of manufacturing a permanent magnet comprising essentially the steps, forming a mixture of $Fe_2O_3$ and at least one oxide selected from the group consisting of BaO and SrO in a mole ratio of about 6:1.0 to 1.2, heating said mixture at a temperature of about 1000° C. for about 4 hours, grinding the resulting product, compacting the resultant ground product under pressure of from about 6000 lbs./in.² to 17,000 lbs./in.² to form a molded body, heating said molded body from room temperature to a sintering temperature of about 1250° C. to 1270° C. at a rate of about 72° C. per minute, maintaining said molded body at said sintering temperature for a period of time of less than one minute and cooling said body.

2. The method of claim 1 in which the oxide is BaO.
3. The method of claim 1 in which the oxide is SrO.
4. The method of claim 1 in which one of the oxides selected from the group consisting of BaO and SrO is replaced by CaO in an amount such that the greatest atomic ratio of calcium to the metal, the oxide of which is replaced by calcium oxide, is 0.4 to 0.6.

References Cited in the file of this patent

UNITED STATES PATENTS

| 1,946,964 | Cobb | Feb. 13, 1934 |
| 2,452,531 | Snoek | Oct. 26, 1948 |
| 2,565,861 | Leverenz et al. | Aug. 28, 1951 |
| 2,762,777 | Went et al. | Sept. 11, 1956 |
| 2,762,778 | Gorter et al. | Sept. 11, 1956 |

OTHER REFERENCES

Brockman: "Electrical Eng.," July 1952, vol. 77, pp. 644–647.

"RCA Review," September 1950, vol. II, No. 3, page 346.